United States Patent

Bald

[11] Patent Number: 5,397,231
[45] Date of Patent: Mar. 14, 1995

[54] POSITION ASSEMBLY FOR USE IN ASSEMBLING TWO COMPONENTS

[76] Inventor: Hubert Bald, Schutzenstr. 1, Bad Berleburg, Germany

[21] Appl. No.: 101,264
[22] PCT Filed: Jun. 23, 1987
[86] PCT No.: PCT/EP88/00546
§ 371 Date: Jan. 22, 1990
§ 102(e) Date: Jan. 22, 1990
[87] PCT Pub. No.: WO88/10172
PCT Pub. Date: Dec. 29, 1988

Related U.S. Application Data

[63] Continuation of Ser. No. 445,730, Jan. 22, 1990, abandoned.

[30] Foreign Application Priority Data

Jun. 23, 1987 [DE] Germany .................. 37 20 604.4
Jul. 7, 1987 [DE] Germany .................. 37 22 309.7
Jul. 7, 1987 [DE] Germany .................. 37 22 308.9

[51] Int. Cl.⁶ .................................... B29C 45/66
[52] U.S. Cl. .................................... 425/589; 425/595; 425/450.1
[58] Field of Search ............ 425/589, 590, 595, 451.9, 425/450.1

[56] References Cited

U.S. PATENT DOCUMENTS

| 2,908,195 | 10/1959 | Benes . | |
| 4,372,738 | 2/1983 | Black et al. | 425/451.9 |
| 4,512,068 | 4/1985 | Piotrowski . | |
| 4,561,626 | 12/1985 | Black | 425/451.9 |
| 4,671,764 | 6/1987 | Hehl | 425/595 |
| 5,078,590 | 1/1992 | Högseth | 425/589 |

FOREIGN PATENT DOCUMENTS

| 0048458 | 9/1981 | European Pat. Off. . |
| 0111092 | 10/1983 | European Pat. Off. . |
| 0255042 | 7/1987 | European Pat. Off. . |
| 2321622 | 3/1977 | France . |
| 2411667 | 7/1979 | France . |
| 885951 | 8/1953 | Germany . |
| 2002003 | 11/1970 | Germany . |

*Primary Examiner*—Tim Heitbrink
*Attorney, Agent, or Firm*—Townsend and Townsend Khourie and Crew

[57] ABSTRACT

A positioning device for mating two components having a spherical positioning element to be engaged into a positioning recess. The recess is formed in a plate-shaped member forming the bottom of a pot-shaped insert so that the plate-shaped member can be deflected inwards.

6 Claims, 4 Drawing Sheets

POSITION ASSEMBLY FOR USE IN ASSEMBLING TWO COMPONENTS

This is a continuation of application Ser. No. 07/445,730, filed Jan. 22, 1990, now abandoned.

BACKGROUND OF THE INVENTION

The invention relates to a positioning device for the mating of two components having a center axis at the corresponding positioning point, wherein the axes run coaxially when the components are matched. For example, one component could be a machine table and the other an interchangeable pallet or one component could be a mounting base and the other a workpiece to be mounted on the mounting base, etc.

Often, only very small deviations of the coaxial position of the two components can be tolerated, for example only an axial offset of a few microns can be accepted. Hence, the positioning device used must operate accurately and reproducibly.

An extremely accurate positioning device is described and represented in German Patent Specification 2,537,146. This publication discloses a positioning arrangement for use in assembling two components. Depending on the overall size or the material mass of the components to be positioned, the positioning elements and recesses used will be dimensioned so that the contact pressure occurring upon deformation remains within the allowable limit for the material used. However, with increasing size of the contact zones, the tensional force to be applied for the second mating phase also increases, which leads to unacceptable values for many applications.

SUMMARY OF THE INVENTION

The object of the invention is to further develop a generic positioning device so that, in spite of large positioning diameters, only moderate mating forces have to be applied. Large positioning diameters are preferred in this case because they can be provided with large passages for clamping devices, because high transverse positioning forces can be counteracted, and because unavoidable wear is low and thus the repeatable accuracy of positioning is high.

If hardened steel is used for the positioning element and the positioning recess and if it is assumed that the positioning element is a ball which interacts with a conical recess having a cone angle of 60°, the tensional forces according to the following table result for different ball diameters:

| Ball Dia. (mm) | Tensional Force (N) |
| --- | --- |
| 5 | 5000 |
| 25 | 50000 |
| 70 | 300000 |

Although in this case a mating gap of only 0.06 to 0.08 mm is used, the tensional forces given above can lead to unacceptable deformations of the components to be positioned.

In the case of the known positioning principle, a material deformation must necessarily be carried out to reduce the mating gap which initially exists between two components. According to the teaching of German Patent number 2,537,146, this material deformation takes place principally as a result of compressive stress generated in the contact zones. The solution according to the present invention is to choose another type of elastic deformation, namely a material deformation resulting principally from flexural stress in the walls transferring transverse positioning forces. As a result, a considerably lower force is required to close the mating gap. Surprisingly, it is found that, in spite of the axial deflection movement, the positioning accuracy is not impaired, provided that the displacement actually takes place only in the axial direction. This distinguishes the positioning device of the present invention from the so-called "ball latch", known as a furniture fitting. In such a furniture fitting, one of the interacting elements, namely the ball, is moveable against spring force in a bore which has unavoidable radial backlash.

The dimensioning of the flexurally deformable regions of the components has to be carried out depending on the individual case. Influencing variables to be considered are the mass of the component to be positioned, the wedge angles defined by the tapers of positioning element and depressions, the friction coefficients, etc.

The present invention is particularly useful in situations where components have to be mated with ultra precision, i.e. 0.001 mm tolerance range, in the given relative positions.

Of particular interest to the present invention are positioning problems where only one positioning point is suitable, such as in the central positioning of a round interchangeable pallet, or such jobs where two or more positioning devices are used for the positioning of a component with respect to both coordinate axes of a mating plane. The latter problem is entailed, for example, if a jig base plate or a workpiece, such as that shown in FIG. 5, is to be repeatedly positioned very accurately in a specified relative position.

The particular advantages of the positioning principle of the present invention are freedom from backlash and the ability to choose mating forces as small as desired even for large ball diameters because of the corresponding component dimensioning, and because of the ball shape of the positioning element. The extent to which the effects of these advantages play a part in the solution of positioning problems in the accuracy range of 0.001 mm is not immediately obvious. A person skilled in the art dealing with this subject area knows, however, that diverse influencing factors are always determinant for the final accuracy of positioning. The individual contributions of certain factors are to be eliminated or minimized by selective measures. In this sense, the effects described below merit significance:

In the case of a ball, an oblique position of an axis of symmetry of the positioning element cannot occur due to production errors, alignment errors or due to a flexural load (positioning forces), as is the case for example with the "pin/bore" positioning principle.

Even in the case of a calotte-shaped design for the counter-contact zones of the positioning recesses, there is no enforced alignment of the elements involved by positive locking, in spite of the congruent shape of the contact surfaces. For this reason, no wear affecting the accuracy can occur either. With the arrangements illustrated in FIG. 1 and FIG. 5, an oblique position of the two components to be mated can occur in the mating operation.

In the case of the arrangement of FIG. 5, this is always the case due to different inside dimension tolerances in the upper and lower parts. Here the mating operation is preferably carried out such that, after placing the components one on the other, the tensional force F is applied completely at one positioning point, for example the right-hand point, bringing about a clear coincidence of the center axis of the two positioning recesses at this point. Upon subsequent application of the full tensional force F at the left-hand positioning point, the distance tolerances are compensated by asymmetrical deformations of the contact zones. Hence, the exact centering effect in the direction perpendicular to an imaginary line joining the two positioning points is preserved. This effect is favored by the combination of design features according to the present invention.

BRIEF DESCRIPTION OF THE DRAWINGS

The enclosed drawings represent the basic principle and preferred application examples of the invention and are explained in detail below.

DESCRIPTION OF THE PREFERRED EMBODIMENTS

Figure 1:
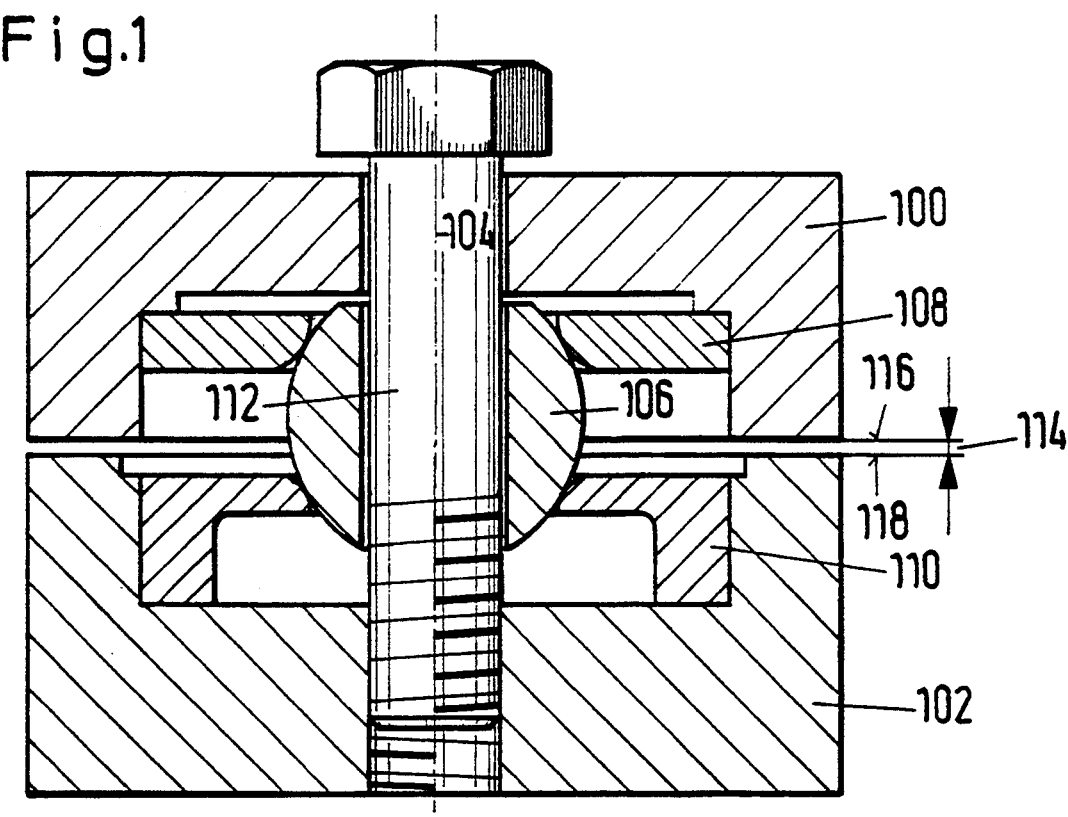
FIGS. 1 and 2 each show an axial section of a positioning device according to the principles of the present invention showing the basic positioning principle with the parts interacting before and after mating.
Figure 2:
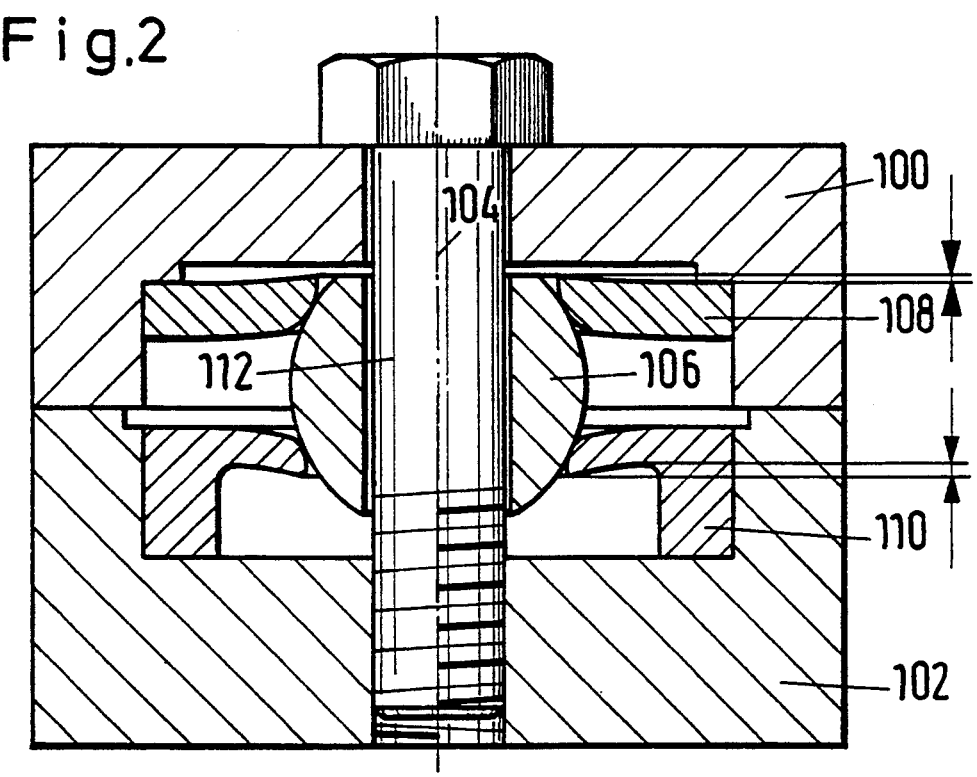

The basic effective principles of the positioning device according to the invention are illustrated in FIGS. 1 and 2. FIG. 1 represents the situation before clamping and FIG. 2 represents the situation after clamping.

In the embodiment according to FIGS. 1 and 2, the two components 100 and 102 are to be centered with respect to an axis 104. Axis 104 runs through the center point of the ball 106. Each component 100 and 102 is provided with a positioning plate 108 and 110 respectively. These plates are designed differently from each other and are inserted, in each case, in a corresponding bore of the component concerned. The plate 108 is actually only a perforated disk supported, close to its outer circumference, by a shoulder of the component 100. The plate 110 is pot-shaped with a central perforation of the bottom and is supported by the free edge of its rim. The ball 106 is drilled-through and passed through, with backlash, by a clamping screw 112. The clamping screw 112 can be screwed into the component 102 and is pressed by its head on to the opposite outer surface of the component 100.

A theoretical ball diameter can be defined by contact zones of the positioning recesses in the positioning plates when the components are in abutment (FIG. 2) but without the actual ball 106. This theoretical diameter is smaller than the actual diameter of ball 106, so that before the tightening of the screw there is, as shown in FIG. 1, a gap 114 between the mutually opposite mating surface 116, 118. On clamping together by means of the screw, the parts 106, 108 and 110 are deformed elastically, the ball 106 by compressive stresses and the plates 108 and 110 by compressive stresses and flexural stresses, it being possible for the designer to divide up the deformation components by corresponding choice of dimensions. Of course, the modulus of elasticity of the materials used also plays a part in this case, as does the friction coefficient acting between them and the profile of the positioning recesses and the selected contact zone of the ball 106 (closer to its equator or closer to its poles). It has been found that, even with ball diameters of 60 mm, a repeatable accuracy of centering of the order of 1 micron and less can be achieved without having to apply a disproportionately high tensional force.

Figure 3:
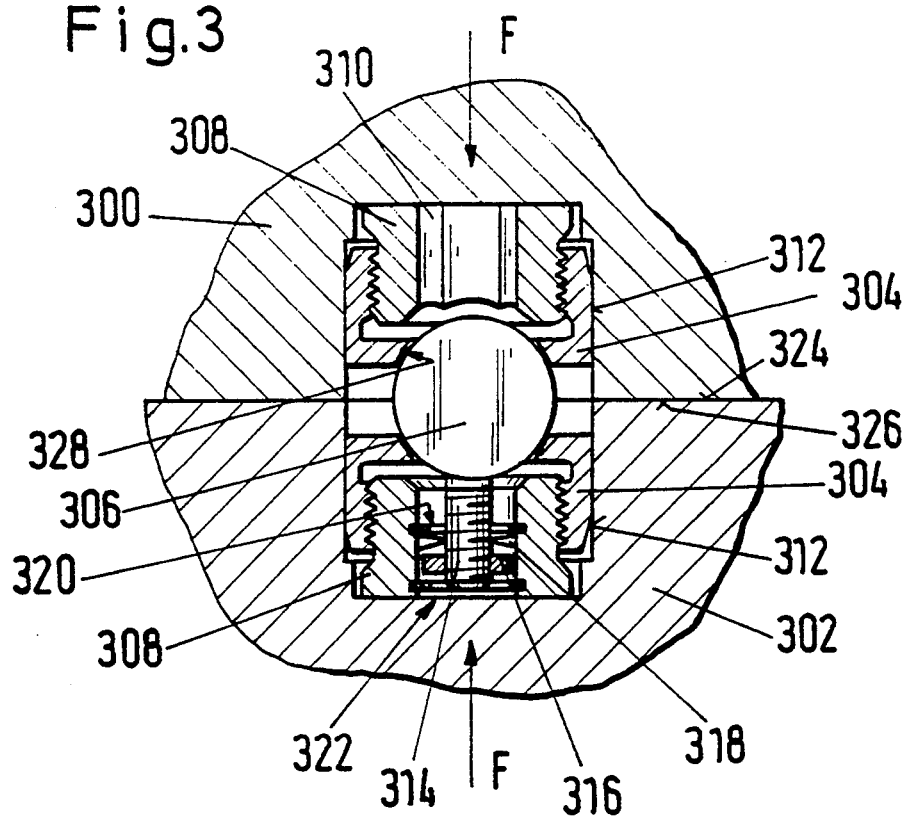
FIG. 3 shows, in axial section, a positioning device according to the invention in a configuration suitable for universal application.
Figure 4:
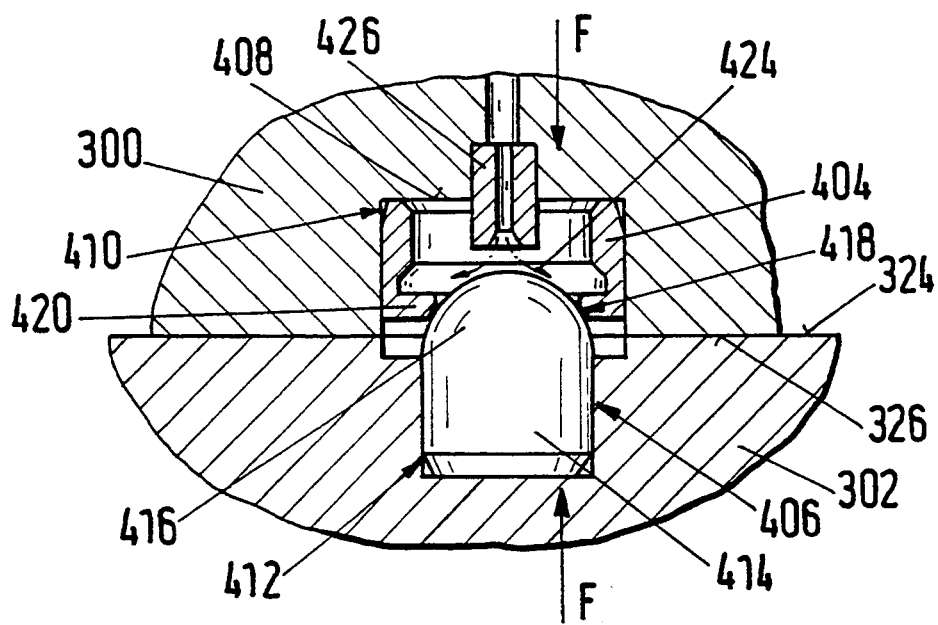
FIG. 4 shows a cross-section of another design of the positioning device with only one axially displaceable positioning recess.

In FIGS. 3 and 4, positioning devices are shown which can be used quite generally, for example in the area of mechanical engineering or the construction of jigs. In this case, the positioning devices have been realized by cooperating standardized constructional elements. The constructional elements, bearing the positioning recesses 328, 418 and deformable in the axial direction at their membrane-shaped portions, are designed as press-in "positioning inserts". These standardized positioning inserts are provided with hardened and ground surfaces on the outside diameter and at the positioning recess and have a press-in phase at the outer cylinder.

The situations represented in FIGS. 3 and 4 correspond to that of FIG. 2. Components 300 and 302, to be positioned in an accurate relative position, are clamped together by a tensional force F at their mating surfaces 324 or 326. This is done by eliminating the mating gap (similar to 114 in FIG. 1) by deforming the plate-shaped part of the positioning inserts 304 or 404 (in FIG. 4).

In FIG. 3, the depth of the positioning inserts 304 pressed into the bore 312 can be predetermined or changed by screw insert 308. A hexagon socket 310 is used to transfer a screwing torque.

The press fit of the positioning insert 304 ensures concentric seating of the positioning recess 328 relative to the component bore 312 and at the same time guarantees a good transversely axial rigidity of the positioning insert.

In order to captivate the ball 306 to serve as the positioning element, a threaded bolt 314 is welded on, which is in engagement with a nut 316, bearing against cup springs 318. Retaining rings 320 and 322 prevent the cup springs and nut from dropping out.

In FIG. 4, the positioning insert 404 comprises the plate-shaped component part 420 with the positioning recess 418 and abuts the bottom 408 of the component bore 410.

In this case, the positioning element 406 has a spherical shape. However, it is preferable to have a ball-shaped contact zone 416 that projects beyond the mating surface 324 while a cylindrical part 414 is pressed into the receiving bore 412 of the component 302.

Inserted in the component 300 is a nozzle 426, the inner bore of which is connected to a compressed air source (not shown).

On approach of the two mating surfaces 324, 326 during the mating operation, there is an annular gap between the contact zone 416 and the positioning recess 418. An air jet passing through the nozzle 426 during the mating operation is transformed upon impact with the contact zone 416 into an air film which is rotationally symmetrical with respect to the center axis, indicated by the arrows 424. The air jet blows away any dirt particles present on the surface of the contact zone 416.

After carrying out the mating operation, air can be admitted through the nozzle 426 into the then closed internal space of bore 410 to test the joint for tightness.

Figure 5:
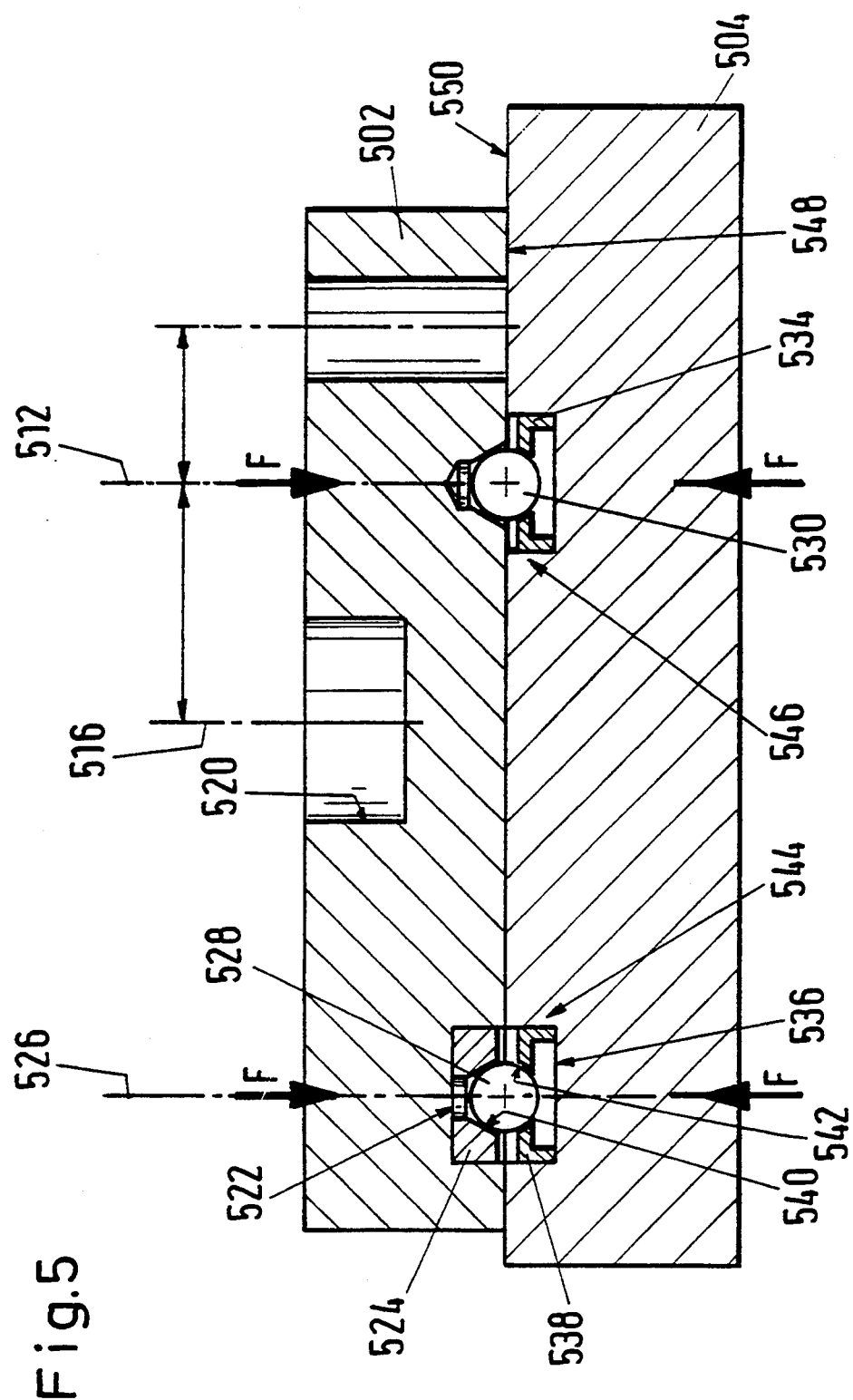
FIG. 5 shows, in section, a constructional unit comprising a mounting base with mounted workpiece.
Figure 6:
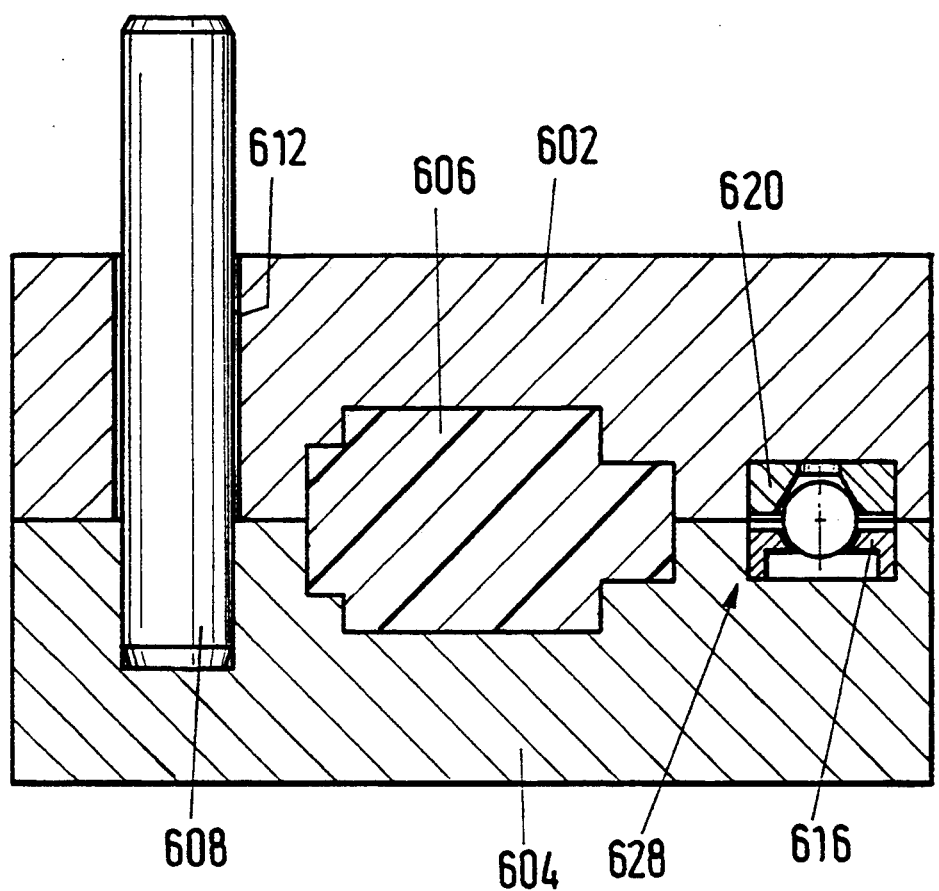
FIG. 6 shows, in section, a constructional unit comprising two mold halves.

Specific areas of use of the positioning devices described thus far are shown in FIGS. 5 and 6.

In FIG. 5, a component 502 is positioned relative to mounting base 504 using two positioning devices 544 and 546 under the influence of the tensional forces symbolized by arrows F. In this situation, the mounting surface 548 of the component 502 is in abutment against the receiving surface 550 of the mounting base.

The center axes of the positioning devices, aligned using the ball-shaped positioning elements 528 and 530, are marked by the lines 512 and 526.

To illustrate the possibility of variation, the two positioning devices comprising different constructional elements are put together. On the left, positioning inserts 524 and 538 (similar to part 404 in FIG. 4) are inserted respectively in the receiving bores 522 and 536. The positioning inserts 524 and 538 form with their central bores the actual positioning recesses 540 and 542.

On the right, the positioning recess is formed in the lower part on the positioning insert 534 and in the upper part it is made directly in the component 502.

The mounted component 502 could be any workpiece. To allow a particular application for the positioning device according to the invention to be demonstrated, it is assumed, in FIG. 5, that the component 502 is a standard component, a certain number of which are preworked by a producer of standard units and subsequently reworked by the user to produce the final shape.

Such subsequent reworking, for example the production of a cylindrical recess 520 central to the center axis 516, takes place as a rule by several successive work operations (for example, milling, eroding, grinding) on different work machines.

What is important in the implementation of the successive operations is that, in each operation, an accurate dimensional relationship with the working features created in the preceding operation has to be established. Furthermore, it may also be necessary that the user create a working feature which represents an accurate dimensional relationship with features already created by the producer, for example bore 508.

During the course of further working at the user, the positioning recesses 540 and 518, made by the producer, take on the job of performing an accurate alignment of the component with each new work operation. Further, they serve as a reference dimensional embodiment for the dimensions to be established during the operation.

In each work operation, the mounting base 504 may be a different one, however it can also remain on the same working machine.

In the latter case, the measuring system of the working machine is advantageously brought into an accurate dimensional relationship with the mounting base. The center axis of the positioning inserts 538 and 534 for example, can be used for this purpose. This will allow the accurate and automatic alignment of the machine measuring system relative to the component 502.

With the process described, both a significant rationalization effect and, depending on the ultra precise positioning accuracy of the positioning devices, a considerable increase in the accuracy of the position of the working features produced on the components can be achieved.

While the individual parts of the positioning devices fitted on the mounting bases are always reused at the same point, this is not the case for the component 502.

To reduce the processing expenditure for the component 502, the positioning recess 518 may be made directly into the component body.

In this case, a ball calotte-shaped design of the contact zones is advantageous. A further possibility of cost saving is obtained if the standard component 502 initially contains the receiving bore 522, into which the positioning inserts 524 with the actual positioning recesses 540 are inserted (pressed) later. The positioning inserts 524 are reusable many times.

More than 2 positioning recesses may also be made on the component 502. As a rule, the mounting base 504 will have a multiplicity of positioning recesses to be able to receive components of different sizes.

The center axis of the positioning recesses of component and mounting base preferably lie on the crossing point of grid lines of a standard grid.

FIG. 6 shows the use of a positioning device on an injection mold for the extremely accurate centering of the two mold halves 602 and 604. The positioning device 628 and the guide column 608 are graphically represented only once, although there are two of each. The guide columns 608 are inserted undersize in the guide bores 612. They take over the guidance of the upper mold upon opening of the mold for the ejection of the molding 606 and, also, upon closing of the mold to precenter the mold halves prior to the positioning operation by the positioning devices 628. This does not commence until the final phase of the closing displacement. In the example shown, the positioning devices 628 have positioning inserts 616 and 620, of which only the part 616 has an axially deformable plate-shaped component part.

The forces symbolized by the arrows F may be generated not only manually using mechanical clamping elements, but also it can be initiated by a partial vacuum, magnetically, electromagnetically, hydraulically or by other means.

The invention has now been explained with reference to specific embodiments. Other embodiments will become apparent to those ordinarily skilled in the art. It is therefore not intended that this invention be limited except as indicated by the appended claims.

It is claimed:

1. A positioning assembly for use in assembling a first and a second component said first and second components comprising mutually facing mating surfaces which, when assembled, abut one another, wherein:

(a) a projecting positioning element extends from said first component, said positioning element being centrally symmetrical with respect to a first axis and tapering outward in a spherically curved manner in a first region of contact zones;

(b) said second component further comprising a positioning recess said positioning recess being centrally symmetrical with respect to a second axis and tapering inward in a second region of contact zones, said first and second axes being coincident when said components are assembled;

(c) upon assembly, in a first assembly phase, said positioning element penetrates said positioning recess until said first region of contact zones of said positioning element engage said second region of contact zones of said positioning recess, while there is still a gap between said mating surfaces;

(d) in a second assembly phase, said gap is closed under the effect of an axial tensional force causing material at the contact zones to be principally flexurally deformed by elastic deformation with material displacement essentially in an outwardly axial direction, said elastic deformation providing for a precise positioning of said first and second components; and (e) said material comprises a plate-shaped member that is supported only adjacent an outer contour thereof so as to be flexible in said axial direction, said plate-shaped member being a pot-shaped member received in a bore of a respective one of said first and second components, and wherein said positioning element contacts and flexurally deforms said plate-shaped member in said second assembly phase.

2. A positioning assembly as claimed in claim 1, wherein both said components have positioning recesses, between which said positioning element is disposed.

3. A positioning assembly as claimed in claim 1, wherein said pot-shaped member is inserted with a close fit into said bore.

4. A positioning assembly as claimed in claim 1, wherein said positioning element is spherically shaped at least on one side and at least in the region of contact with said positioning recess.

5. A positioning assembly as claimed in claim 4, wherein said positioning element is a ball.

6. A positioning assembly as claimed in claim 3, wherein said positioning element protrudes into one of said components thereby providing a self-holding fastening.

* * * * *